United States Patent Office 3,530,190
Patented Sept. 22, 1970

3,530,190
RECOVERY OF CATALYST IN OXO PROCESS
Kenneth L. Olivier, Placentia, Calif., assignor to Union Oil Company of California, Los Angeles, Calif., a corporation of California
No Drawing. Filed Dec. 11, 1967, Ser. No. 689,304
Int. Cl. C07c 45/12
U.S. Cl. 260—604
8 Claims

ABSTRACT OF THE DISCLOSURE

The invention comprises a method for the selective removal of tars and high boiling byproducts formed during hydrocarbonylation of an olefin. In the hydrocarbonylation, the olefin is contacted with a liquid phase reaction medium containing a homogeneous catalyst comprising a complex of a Group VIII metal salt or hydride and a biphyllic ligand. During the hydrocarbonylation there occurs a slight conversion to high boiling byproducts which accumulate in the distillate bottoms returning to the hydrocarbonylation zone.

All or a portion of the distillation bottoms are, in accordance with the invention, contacted with an aqueous cyanide solution which is effective for the extraction of the catalyst metal values as cyano complexes from the distillate residue. The cyanide solution is preferably an aqueous solution of hydrogen, alkali metal or other water soluble cyanides. The extracted high boiling residue can then be economically discarded from the system and replaced with fresh reaction medium. The cyano complex of the metal catalyst is processed for the recovery of the metal.

DESCRIPTION OF THE INVENTION

The invention relates to a method for the removal of tar and high boiling byproducts from a hydroformylation process.

In a hydroformylation process practice using a liquid phase reaction medium and a homogeneous catalyst, tarry constituents and high boiling byproducts are formed. If these are permitted to accumulate in the reaction medium they will ultimately deactivate the catalyst. Although catalyic activity can be maintained by continuously or intermittently replacing at least a portion of the reaction medium with fresh solvent and catalyst, economic processing requires that the catalyst values be recovered from the spent reaction medium before its discard. Revovery is particularly necessary with carbonylations employing a Group VIII noble metal or other precious metal catalyst components. I have found that the precious metal components of the catalyst can be recovered in substantially complete yields by extraction with an aqueous solution of a hydrogen, alkali metal or ammonium cyanide. The reaction medium after extraction contains the high boiling and tarry constituents and can be discarded without significant loss of the Group VIII metal.

The process of hydroformylation wherein my invention affords the greatest value is that described in copending applications Ser. Nos. 518,562 and 642,191. The process comprises contacting the olefin, carbon monoxide and hydrogen with a liquid reaction medium containing a homogeneous catalyst at temperatures from about 20° to about 300° C. and pressures from 1 to about 1000 atmospheres. In the first of the aforementioned applications the catalyst is described as a Group VIII noble metal halide complex with carbon monoxide and a biphyllic ligand. Also included in the reaction medium is a cocatalyst comprising a polycyclic, heterocyclic, saturated amine having at least one nitrogen in a bridgehead position. In the other application aforementioned, the catalyst employed is a Group VIII noble metal hydride complex with carbon monoxide and a biphyllic ligand.

The biphyllic ligands are compounds capable of forming a complex with the catalyst by coordinate covalent bonding and have one atom with an unshared pair of electrons for such bonding. These can be organic compounds of trivalent phosphorus, antimony, arsenic and bismuth. Typically, the biphyllic ligand is an aromatic phosphine such as triphenyl phosphine.

During the hydroformylation there occurs a slight but continuous accumulation of high boiling byproducts and tar fractions which remain in the bottoms from the distillation zone used to recover the products. These are high boiling and therefore accumulate in the reaction medium with the catalyst. In accordance with my invention all or a portion of the reaction medium is continuously or intermittently contacted with an aqueous solution of a soluble cyanide which is effective in selective extraction of the metal values of the catalyst.

The hydroformylation can be performed batchwise or in a continuous processing by contacting the olefin, carbon monoxide and hydrogen with the reaction medium containing the catalyst. Temperatures from 30° to about 300° C., preferably from 75° to 200° C., can be used with pressures from 10 to 1000 atmospheres; preferably from 20 to about 150 atmospheres.

In batch processing the reaction can be performed for a sufficient time to accumulate the aldehyde and/or alcohol product in the reaction medium to a sufficient concentration, e.g., up to 5 to 50 weight percent to permit economic recovery of the product. Continuous processing is preferred, however, for ease of operation and to reduce the residence time of the carbonyl product in the reaction zone and thus to reduce the amount of tarry byproducts.

In continuous processing a vapor or liquid phase effluent containing the carbonyl product is continuously removed. With low boiling products, e.g., butyraldehydes, valeraldehydes, etc., the product can be vaporized or stripped from the reactor and condensed from the vapor effluent. The uncondensed gases comprising unreacted carbon monoxide, hydrogen and olefin are then recycled With higher boiling carbonyls, a portion of the liquid contents of the reactor is continuously withdrawn, depressured to release dissolved, unreacted gases which are recycled, and then distilled to recover the carbonyl product from the reaction medium which is recycled to further processing.

The ethylenically unsaturated compound carbonylated in accordance with my invention can comprise any olefin having from 2 to about 25 carbons; preferably from 2 to about 18 carbons. This olefin has the following structure:

$$R_2R_1C=CR_3R_4$$

wherein $R_1$, $R_2$, $R_3$ and $R_4$ are hydrogen, alkyl, cycloalkyl, aryl, alkaryl, aralkyl, hydroxyalkyl, hydroxyaryl, aminoalkyl or aminoaryl or wherein one of said $R_1$ and $R_2$ and one of said $R_3$ and $R_4$ together form a single alkylene group having from 2 to about 8 carbons.

Examples of useful olefins are the hydrocarbon olefins such as ethylene, propylene, butene-1, butene-2, 2-methylbutene-1, cyclobutene, hexene-1, hexene-2, cyclohexene, 3-ethylhexene-1, isobutylene, octene-1, 2-propylhexene-1, ethylcyclohexene, decene-1, cycloheptene, cyclooctene, cyclononene, 4,4'-dimethylnonene-1, dodecene-1, undecene-3, 6-propyldecene-1, tetradecene-2, 7-amyldecene-1, oligomers of olefins such as propylene tetramer, ethylene trimer, etc., hexadecene-1, 4-ethyltridecene-1, octadecene-1, 5,5 - dipropyldodecene - 1, vinylcyclohexane, allylcyclohexane, styrene, p-methylstyrene, alpha-methylstyrene, p-vinylcumene, beta-vinylnaphthalene, 1,1-diphenylethylene, allylbenzene, 6-phenylhexene-1, 1-3-diphenylbutene-1, 3-benzylheptene-1, o-vinyl-p-xylene, m-aminostyrene, divinylbenzene, 1-allyl-4-vinylbenzene, allylamine, p-aminostyrene, allylaniline, crotonyl alcohol, allylcarbinol, beta-allylethanol, allylphenol, etc. Of the preceding the alpha olefins and olefins having 2 to about 8 carbons are preferred classes.

The reaction is performed under liquid phase conditions and, when the olefin comprises a liquid at the reaction conditions, the olefin can be used in excess to provide the liquid reaction medium. If desired, however, any suitable organic liquid can be employed as a reaction solvent; preferably, organic solvents which are inert to the reaction conditions, the reactants, the catalyst and the products are employed. Examples of suitable solvents which can be used in accordance with our invention include hydrocarbons such as the aromatic aliphatic or alicyclic hydrocarbons, ethers, esters, ketones, etc.

Examples of suitable hydrocarbons that can be employed in the solvents include aormatic hydrocarbons such as benzene, toluene, xylene, ethylbenzene, tetralin, etc.; aliphatic hydrocarbons such as butane, pentane, isopentane, hexane, isohexane, heptane, octane, isooctane, naphtha, gasoline, kerosene, mineral oil, etc.; alicyclic hydrocarbons, e.g., cyclopentane, cyclohexane, methylcyclopentane, decalin, indane, etc.

Various alkyl and aryl ketones can also be employed as the reaction solvent, e.g., acetone, methylethyl ketone, diethyl ketone, diisopropyl ketone, ethyl-n-butyl ketone, methyl-n-amyl ketone, cyclohexanone, diisobutyl ketone, etc.

Ethers can also be employed as the reaction solvent, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as the solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl maleate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc. A preferred class of ester solvents includes the lactones, e.g., butyrolactone, valerolactone and their derivatives having lower ($C_1$–$C_5$) alkyl substituents.

Alcohols can also be employed as a reaction solvent. Preferably tertiary alcohols are employed since these materials are substantially non-reactive under the reaction conditions. Primary and secondary alcohols can be employed but are less preferred since these materials can react with aldehyde compounds under the reaction conditions to produce acetals. While in some instances these may be desired products, it is generally desirable to produce the carbonyl compound or alcohol directly without the formation of the acetal. It is of course apparent that, if desired, the acetal can be hydrolyzed to obtain the aldehyde. Examples of alcohols that can be employed as solvents include the aliphatic and alicyclic alcohols such as methanol, ethanol, isopropanol, butanol, t-butanol, t-amyl alcohol, hexanol, cyclohexanol, etc.

Also useful as solvents for the reaction are the aldehyde products of the carbonylation. These products are surprisingly inert and resist aldol condensation and hydrogenation under the hydroformylation conditions. Accordingly, aldehydes such as propionaldehyde, butyraldehyde, valeric, hexanoic, heptenoic, caproic, decanoic aldehydes, etc., can be employed as the reaction medium.

The catalyst comprises a Group VIII metal hydride or salt, typically a halide, in complex association with carbon monoxide and a biphyllic ligand. There can also be incorporated in the catalyst a polycyclic, heterocyclic amine having a nitrogen in at least one bridgehead position. Examples of suitable Group VIII metal hydrides, carbonyls or salts useful in forming the catalyst are those which are commercially available and can be purchased and used directly. Examples of suitable sources of noble metal catalysts are as follows: bis(triphenylphosphine) iridium carbonyl chloride; tris(triphenylphosphine)iridium carbonyl hydride; iridium carbonyl; iridium tetrabromide; iridium tribromide; iridium trifluoride; iridium trichloride; osmium trichloride; chloroosmic acid; palladium hydride; palladous chloride; palladous cyanide; palladous iodide; palladous nitrate; platinic acid; platinous iodide; palladium cyanide; sodium hexachloroplatinate; potassium trichloro(ethylene)platinate(II); chloropentaaminorhodium(III) chloride; rhodium dicarbonyl chloride dimer; rhodium nitrate; rhodium trichloride; tris(triphenylphosphine)rhodium carbonyl hydride; tris(triphenylphosphine)rhodium(I)chloride; ruthenium trichloride; tetraaminorutheniumhydroxychlorochloride, etc. Suitable salts of other Group VIII metals include cobalt chloride, ferric acetate, nickel fluoride, cobalt nitrate; etc., carboxylates of $C_2$–$C_{10}$ acids, e.g., cobalt acetate, cobalt octoate, etc. nickel sulfate, ferric nitrate, etc.

The catalyst also comprises a biphyllic ligand. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following formula:

or the following formula:

wherein E is a trivalent atom selected from the class consisting of phosphorus, arsenic, antimony and bismuth;
wherein R is a member of the class consisting of hydrogen, alkyl from 1 to 8 carbon atoms, aryl from 6 to 8 carbons and amino, halo and alkoxy substitution products thereof; and
wherein R' is alkylene having from 1 to about 8 carbons.

Examples of suitable biphyllic ligands useful in my invention to stabilize the catalyst composition are the following: trimethylphosphine, triethylarsine, triethylbismuthine, triisopropylstibine, chlorodiethylphosphine, triaminobutylarsine, ethyldiisopropylstibine, tricyclohexylphosphine, triphenylphosphine, triphenylbismuthine, tri(o-tolyl)phosphine, tris(2-ethylhexyl)arsine, phenyldiisopropylphosphine, phenyldiamylphosphine, ethyldiphenylphosphine, chlorodixylylphosphine, chlorodiphenylphosphine, tris(diethylaminomethyl)phosphine, ethylene bis(diphenylphosphine), tritolylphosphine, tritolylstibine, hexamethylene bis(diisopropylarsine), pentamethylene bis(diethylstibine), diphenyl(N,N-dimethylanilinyl)phosphine, trianilinylphosphine, tri(3,5-diaminophenyl)phosphine, trianilinylarsine, anilinyldiphenylbismuthine, etc. Of the aforementioned, the arylphosphines are preferred because of the demonstrated non-equivalent greater activity of catalysts comprising the arylphosphines.

The cocatalyst employed with the Group VIII noble metal halide catalyst is a poly(heterocyclic)amine having at least one nitrogen in a bridgehead position. The term "bridgehead position" is well established in chemical nomenclature to identify the position of an atom which is common to at least two of the rings of the polycyclic compound. Preferably the amine is an atom-bridged system, i.e., atoms, generally methylene carbons, form the bridge or link in the molecule rather than a simple valence bonding. The amine is also used in catalytic amounts, e.g., from about 0.001 to about 10 weight percent; preferably from about 0.05 to 5 weight percent of the liquid reaction medium. In general, amines having from 1 to about 4 nitrogen atoms and from 1 to about 25 carbons; preferably from 2 to about 10 carbons; can be employed for this purpose and the following is a listing of representative amines useful in my invention: 1,2,4-triazabicyclo(1.1.1)-pentane; 1,5,6-triazabicyclo(2.1.1)hexane; 5-oxa-1,6-diazabicyclo(2.1.1)hexane; 5-thia - 1,6-diazabicyclo(2.1.1) hexane; 2-oxa-1,5,6-triazabicyclo(2.1.1)hexane; 1,2,5,6-tetrazabicylo(2.1.1)hexane; 5-oxa-1,2,3,6-tetrazabicyclo-(2.1.1)hexane; 1-azabicyclo(3.3.1)heptane; 1-azabicyclo-(2.2.1)heptane; 1,4-methano-1, 1-pyrindine; 2-ox-1-azabicyclo(2.2.1)heptane; 1,4-diazabicyclo(2.2.1)heptane; 7-oxa - 1 - azabicyclo(2.2.1)heptane; 7 - thia-1-azabicyclo-(2.2.1)heptane; 1,7-diazabicyclo(2.2.1)heptane; 1,3,5-triazabicyclo(2.2.1)heptane; 1-azabicyclo(3.2.1)octane; 1,5-diazatricyclo(4.2.1)decane; 1,7-diazatricyclo(3.3.1.2)un-decane; 7-ox-1-azabicyclo(3.2.1)octane; 1,7-diazabicyclo-(3.2.1)octane; 3-thia-1,7-diazabicyclo(3.2.1)octane; 1,3, 6, 8 - tetrazatricyclo(6.2.1)dodecane; 2,8 - diazatricyclo - (7.3.1)teradecane; 1-azabicyclo(3.3.1)nonene, also known as 1-isogranatinine and the oxo, hydroxy and lower alkyl derivatives thereof; 1-azabicyclo(2.2.2)octane also known as quinuclidine as well as the halo, oxo, hydroxy and lower alkyl derivatives thereof; 1-azatricyclo(3.3.1.1) decane; 1,3-diazabicyclo(2.2.2)octane; 1,3-diazabicyclo-(3.3.1)nonene; 1,6 - diazatricyclo(5.3.1)dodecane; 2 - ox-1 - azabicyclo(2.2.2)octane; 4,6,10 - triox - 1-azatricyclo-(3.3.1.1)decane; 1,5 - diazabicyclo(3.3.1)nonene; 1,2,5, 8 - tetrazatricyclo(5. 3. 1.)dodecane; 1, 4 - diazabicyclo-(2.2.2)octane also known as triethylene diamine and its oxo, hydroxy, halo and lower alkyl derivatives thereof; 1,3-diazatricyclo(3.3.1.1)decane also known as 1,3-diazaadamantane; 1,3,5-triazatricyclo(3.3.1)decane; 1,3,5,7-tetrazabicyclo(3.3.1)nonene also known as pentamethylene tetramine; 1,3,5,7 - tetrazatricyclo(3.3.1.1)decane also known as hexamethylene tetramine; 2-oxa-1,3,4-triazabicyclo(3.3.1)nonene; 1-azabicyclo(4.3.1)decane; 1-azabicyclo(3.2.2)nonene; 1,5-diazabicyclo(3.2.2)nonene; 1, 3,5,7-tetrazabicyclo(3.3.2)decane; 1,5-diazabicyclo(3.3.3) undecane; etc.

Of the aforementioned poly(heterocyclic)amines having a nitrogen in a bridgehead position the most common and widely known compound is 1,4-diazabicyclo(2.2.2) octane (triethylene diamine) and this material as well as its oxo, hydroxy, halo and lower alkyl derivatives comprises the preferred cocatalyst for use in my process.

The tar containing reaction medium removed from the reactor or the tar containing residue from the product distillation zone can be concentrated prior to discard from the system by suitable steps, e.g., further distillation at higher temperatures or under reduced pressures to recover the reaction solvent. This concentration can, if desired, preceed the extraction step, however, with highly viscous tars, the addition of from 5 to 50 volume percent of an inert solvent may be necessary to reduce the tar viscosity sufficiently for satisfactory contacting with the cyanide solution.

In such processing, the residue from the product distillation zone is passed to an evaporator where the lower boiling reaction solvent is removed, preferably under vacuum from about 1 to 350 millimeters mercury pressure to concentrate the catalyst components and tar byproducts. The concentrated stream is then contacted with the aqueous cyanide solution to extract the metal values. To avoid excessive decomposition and charring, it is preferred not to heat the residue above about 275° C. Vacuum distillation at temperatures from 110° to about 275° C.; preferably from about 135° to about 235° C. is effective in reducing the volume of residue from 50 to 95 percent, the volatilized solvent and lower boiling tars being removed as distillates from the vacuum distillation. The tar and catalyst concentrate from this treatment can then be extracted with the aqueous cyanide solution with or without an added solvent to reduce its viscosity for the extraction.

The aqueous cyanide solution used for extraction can be a solution of a soluble cyanide. Aqueous solutions are preferred to insure phase separation of the tar and the extracting liquid. Suitable cyanides include hydrogen cyanide; ammonium cyanide; alkali metal cyanide, e.g., sodium, lithium, potassium, cesium cyanides; alkaline earth metal cyanides, e.g., beryllium, magnesium, calcium, strontium, barium cyanides, etc. The Group II-B metal cyanides, zinc, cadium and mercuric cyanides, are also water soluble and useful.

The cyanide can be dissolved in the extraction liquid in a concentration from 0.01 to 20 weight percent; preferably from 1 to 5 weight percent calculated as the cyanide group.

The pH of the aqueous extract is preferably from 7 to 11 and, most preferably, is from 8 to 10. Alkaline materials such as ammonium or alkali metal hydroxides can be incorporated in the solution to raise its pH to the desired value. Concentration of the base can be from 0.1 to about 25; preferably from 1 to about 15 weight percent.

The extraction can be effected simply by thoroughly admixing the extraction liquid with the tar in a batch or continuous manner. With batch processing, the liquids can be admixed in a vat with suitable mixing means, e.g., a propeller mixer. In continuous processing the liquids can be admixed by introduction of the aqueous extraction liquid into the suction line of a centrifugal pump or by introduction of the wash liquid upstream of one or more orifice plates in a line through which the tar fraction is circulated.

The contacting can be effected at any suitable temperature from about 5 to about 250° C., e.g., at the temperature of the residue as it is withdrawn from the distillation zone. Preferably the temperature is from 15 to 125° C. and should be below the decomposition temperature of the particular cyanide dissolved in the extraction liquid.

The resulting admixture of tar residue and wash liquid can then be passed to a suitable separation step. Typically, the separation will be decantation of the liquid accomplished by discharging the admixture into a settling tank which has a sufficient volume to permit the aqueous and organic phases to separate. Preferably means are provided to withdraw the separate phases. Other separation techniques that can be used include conventional liquid-liquid phase separation techniques such as centrifugal separation.

The metal values extracted in the aqueous phase can be recovered by any suitable method. The aqueous extract can be evaporated to dryness and the solid residue can be heated to between about 200° and 1000° C. in any oxygen containing atmosphere, e.g., air or in an inert gas atmosphere such as nitrogen. This calcination will decompose the metal cyano complex and expel nitrogen and carbon from the metal. The metal can of course be recovered by reduction with hydrogen.

The tar residue, freed of its catalyst values, can be discarded from the system. Fresh reaction medium containing fresh catalyst is supplied to the reaction zone in about the same volume amount as the discarded residue to maintain a constant reaction medium and catalyst inventory in the system.

The invention will now be illustrated by the following examples:

Example 1

A tar residue, typical of that produced in a hydroformylation process was treated in accordance with my invention to recover the catalyst values. The residue comprised a toluene solution of 100 grams high boiling aldol condensation polymers (tar), 5 grams triphenylphosphine, 4 grams diazabicyclo (2.2.2) octane (triethylene diamine), 1.2 grams tris(triphenylphosphine) hydrido rhodium carbonyl per liter of toluene.

The extraction was performed by admixing a 25 milliliter portion of the residue with 25 milliliters of an aqueous solution containing 1 weight percent sodium cyanide and 1 weight percent sodium hydroxide. The admixture was stirred and refluxed at atmospheric pressure for one hour and then permitted to separate into phases. The aqueous phase was withdrawn and analyzed and found to contain 93 percent of the rhodium as a soluble rhodium cyano complex.

Example 2

The hydroformylation of propylene was performed by charging a reactor with a reaction medium comprising a toluene solution containing, per liter of toluene, 1.6 grams tris(triphenylphosphine) hydrido rhodium carbonyl, 10 grams triphenylphosphine and 4 grams triethylene diamine.

The reactants were pressured to 500 p.s.i.g. and heated to and maintained at 200° F. while carbon monoxide, hydrogen and propylene were continuously introduced into the liquid reaction medium at 150 liters per hour, 175 liters per hour and 0.7 pound per hour respectively. A vapor effluent comprising 400 grams per hour of butyraldehydes and toluene was continuously removed from the reactor. The butyraldehydes were recovered and the toluene was recycled.

The reaction was performed over a period of 114 hours while from 5 to 25 milliliters per hour of a liquid stream was continuously withdrawn from the reactor and replaced with an equal quantity of fresh reaction medium. The tar or high boiling aldol polymers comprised from 12 to 14 weight percent of the liquid. The withdrawn stream was evaporated at atmospheric pressure to concentrate the tar fraction to 21 weight percent in the residue which also contained 228 milligrams of rhodium per liter. Portions of the tar residue were then extracted at 100° C. by two extractions with aqueous solutions containing 10 weight percent sodium cyanide and 10 weight percent sodium hydroxide. The combined extract phases contained 94 percent of the rhodium in the tar residue subjected to the extraction.

The preceding examples are solely to illustrate a mode of practice of the invention and are not to be construed as unduly limiting thereof. Instead it is intended that the invention be defined by the steps and reagents and their obvious equivalents set forth in the following claims.

I claim:

1. In the hydroformylation of hydrocarbon olefins having from 2 to about 25 carbons to alcohols and aldehydes wherein the olefin, carbon monoxide and hydrogen are contacted with a liquid reaction medium containing a catalyst of a Group VIII metal and a biphyllic ligand selected from the class consisting of hydrocarbyl phosphines, arsines, stibines and bismuthines and wherein the hydroformylation products are vaporized and recovered from reaction medium containing said catalyst by distillation and wherein high boiling byproducts are formed and accumulate in said reaction medium, the improved method for removing the high boiling byproducts from said reaction medium that comprises replacing at least a portion of the used reaction medium with fresh reaction medium and extracting said portion of used reaction medium at reaction medium temperature of from 5° to about 250° C. with an aqueous solution of a member selected from the group consisting of HCN, ammonium cyanide, Group II–B metal cyanides, alkali metal cyanides and alkaline earth metal cyanides to recover the Group VIII metal of said catalyst in said aqueous solution as a cyano complex and discarding the extracted reaction medium containing said tar byproducts from said process.

2. The method of claim 1 wherein the hydroformylation catalyst is a complex of a Group VIII noble metal and a triarylphosphine.

3. The method of claim 1 wherein the hydroformylation catalyst is a complex of a Group VIII metal and a trialkylphosphine.

4. The method of claim 1 wherein the said aqueous solution is an aqueous solution of an alkali metal cyanide.

5. The method of claim 1 wherein the aqueous solution has a pH value from 7 to 11.

6. The method of claim 5 wherein said pH is maintained by addition of ammonium or an alkali metal hydroxide.

7. The method of claim 6 wherein said cyanide is sodium cyanide and said hydroxide is sodium hydroxide.

8. The method of claim 7 wherein the cyano complex is decomposed by calcination and the Group VIII metal recovered by reduction with hydrogen.

References Cited

UNITED STATES PATENTS 3,369,050   2/1968   Greene _____ 260—604 X

OTHER REFERENCES

Griffith et al.: Journ. of the Chem. Soc., 1959, pp. 2757–2762.

Ford-Smith: The Chemistry of Complex Cyanides, 1964, pp. 22, 23, and 44.

Latimer et al.: Reference Book of Inorganic Chem., pp. 430, 433 and 442, 1951.

BERNARD HELFIN, Primary Examiner

R. H. LILES, Assistant Examiner

U.S. Cl. X.R.

23—79; 252—431; 260—578, 598, 599, 600, 602, 617, 618, 620, 632, 635